United States Patent

Jacoby

[15] 3,655,219
[45] Apr. 11, 1972

[54] ADJUSTABLE TWIN-STRUT HANDLEBAR CONSTRUCTION

[72] Inventor: William F. Jacoby, Little Rock, Ark.
[73] Assignee: AMF Incorporated
[22] Filed: Aug. 28, 1970
[21] Appl. No.: 67,777

[52] U.S. Cl..............................280/279, 74/551.3, 74/551.6
[51] Int. Cl.........................................................B62k 21/12
[58] Field of Search.................280/279, 276, 280; 74/551.1, 74/551.2, 551.3, 551.4; 180/33; D90/8, 8.1, 11

[56] References Cited

UNITED STATES PATENTS

| | | | |
|---|---|---|---|
| 2,511,320 | 6/1950 | Benson | 280/279 |
| 3,331,617 | 7/1967 | Jacoby | 280/279 |
| 3,391,582 | 7/1968 | Polley | 74/551.1 |
| 3,340,947 | 9/1967 | Hollinshead et al. | 280/276 |
| 3,477,741 | 11/1969 | Ross | 280/279 |

Primary Examiner—Kenneth H. Betts
Attorney—George W. Price and Walter Lewis

[57] ABSTRACT

Handlebar construction in which a triangular shaped bracket and clamps are used to connect a separate handlebar to twin-struts.

3 Claims, 3 Drawing Figures

Patented April 11, 1972

INVENTOR
WILLIAM F. JACOBY
BY
*Walter Lewis*
ATTORNEY

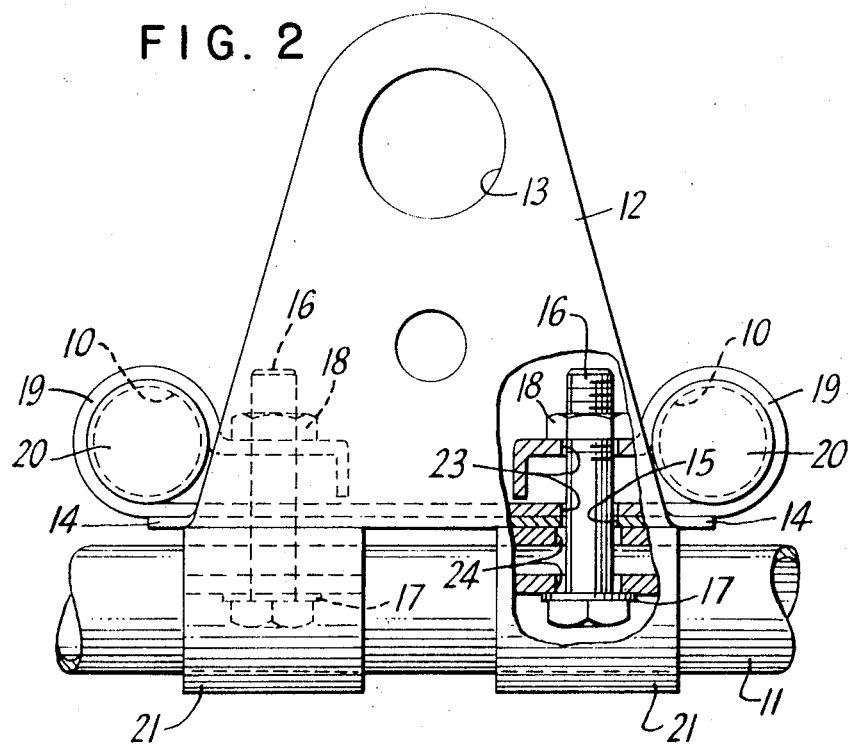
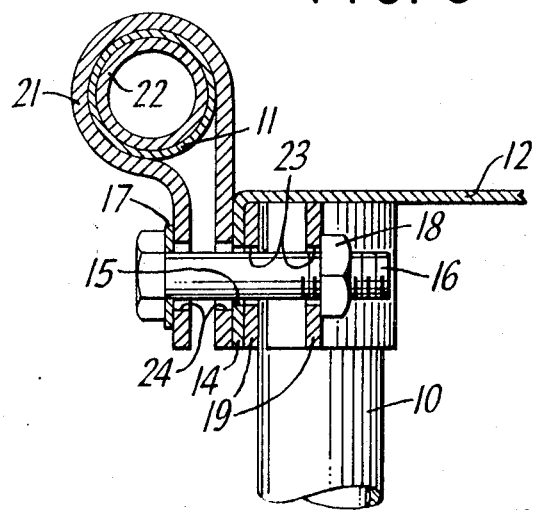
INVENTOR
WILLIAM F. JACOBY

ADJUSTABLE TWIN-STRUT HANDLEBAR CONSTRUCTION

This invention relates to a handlebar construction for bicycles, and more particularly, to a twin-strut handlebar construction which is adjustable.

This invention represents an improvement in the twin-strut bicycle handlebar construction shown in my U.S. Pat. No. 3,331,617 issued July 18, 1967.

It is an object of this invention to make the handlebar of the construction shown in my patent adjustable, and to do this at low cost while still retaining all the advantages of my patented construction.

Briefly, the above stated object is attained by making the handlebar a distinct element as contrasted from the integral extensions of the twin-struts, and the separate handlebar is then adjustably mounted to the twin-struts.

The features of the invention which are believed to be novel are set forth with particularlity in the appended claims. The invention itself, however, both as to its organization and operation, together with further objects and advantages thereof, may best be understood by reference to the following description taken in connection with the accompanying drawings in which:

FIG. 2 is a broken away top plan view of the invention; and

FIG. 3 is an enlarged sectional view taken along the section line 3—3 of FIG. 1.

Figure 1:
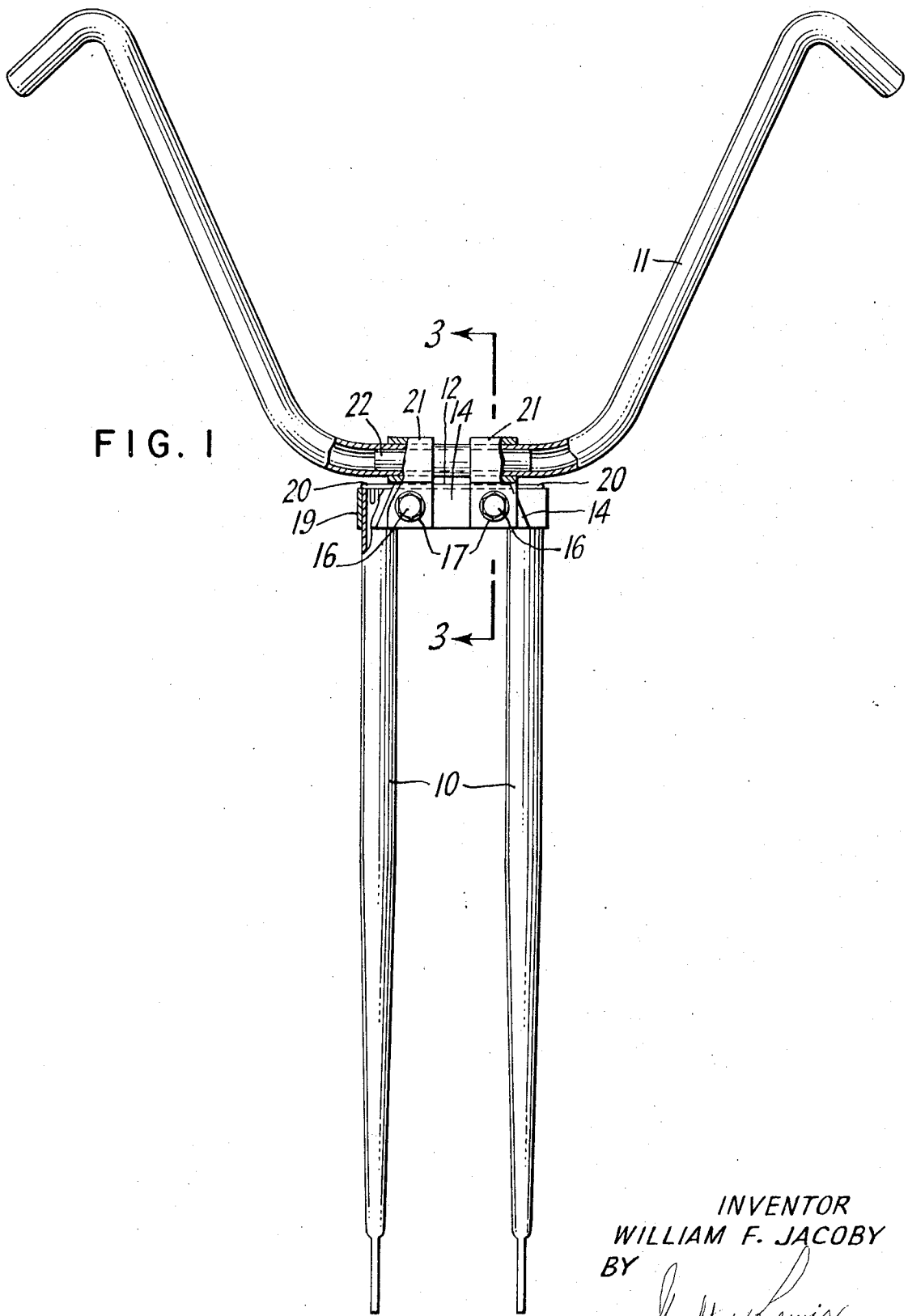
FIG. 1 is a broken away front elevation view of the invention.

Referring now particularly to the drawings, a pair of vertical, spaced and parallel twin-struts 10 have a handlebar 11 adjustably connected to the upper ends thereof. As will be readily understood by those skilled in the art and from a consideration of my U.S. Pat. No. 3,331,617 the twin-strut handlebar assembly 10, 11 is adapted to be connected to a not shown front steering fork of a bicycle. The lower ends of the twin-struts are connected to the lower end of the steering fork at its not shown front wheel axle, and the upper ends of the twin-struts are connected to the not shown stem at the upper end of the steering fork. As in my patent this is accomplished by a generally triangular shaped bracket 12. The rear tip of bracket 12 has an aperture 13 therein to receive said not shown steering fork stem.

The front end of the bracket 12 is bent over to provide a downwardly extending flange 14. This flange 14 has a pair of spaced apertures 15 formed therein. These apertures 15 are intended to receive the bolts 16 of nut and bolt assemblies comprising bolts 16, lock washers 17, and nuts 18. The nut and bolt assemblies 16–18 serve to clamp the upper ends of the twin-struts 10 and the handlebar 11 to the bracket 12.

The clamp 19 for the twin-struts is positioned behind the flange 14 and extends in a transverse direction. Clamp 19 has its opposite ends bent over on itself to embrace the upper ends of twin-struts 10. Clamp 19 is the same as shown in my patent; however, in the instant invention the twin-struts 10 are cut off at this point so as to extend no further. Their hollow upper ends are closed by cap inserts 20.

The adjustable handlebar 11 is positioned above the twin-struts 10. It has a transverse extending central portion which is adjustably clamped to bracket 12 by a pair of generally U-shaped vertical clamps 21. Clamps 21 are positioned ahead of the flange 14. The central portion of handlebar 11 can have a reinforcing insert 22 positioned therein before it is bent into its final illustrated shape.

The opposite ends of the clamp 19 have aligned apertures 23 and the opposite ends of clamps 21 have aligned apertures 24, which are aligned with apertures 15 in flange 14. The bolts 16 extend through all these aligned apertures 24, 15, 23 so that when the nuts 18 are tightened the clamps 19 and 21 are operated to rigidly connect the handle bar, the twin-struts 10, and bracket 12 together. When it is desired to adjust the position of handlebar 11 all that is necessary is to loosen the nuts 18 sufficiently to permit moving handlebar 11 to its desired position, after which the adjusted position is set or locked firmly in place by re-tightening the nuts 18. When the nuts 18 are loosened to adjust the handle bar 11 it will be appreciated that the shown position of the twin-struts 10 is not altered. This is because they are fixed at their lower ends to the not shown front wheel axle which is connected to the lower end of the not shown steering fork, and at their upper ends the bracket 12 is fixed to the not shown steering fork top stem.

By comparing the instant invention with that of my U.S. Pat. No. 3,331,617 it will be readily obvious that the instant invention provides a low cost handlebar adjustment in the twin-strut handle bar arrangement of my patented construction while still retaining all the advantages of my patented construction. In other words, the character and essential parts of my patented construction are not materially altered, and the adjustment at the handlebar can be quickly and conveniently made with conventional tools.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What is claimed as new and desired to be secured by Letters Patent of the United States is:

1. An adjustable twin-strut handlebar construction, comprising a pair of spaced, parallel and vertical extending struts and being adapted to have their opposite ends connected to the opposite ends respectively of a bicycle steering wheel fork, said means comprising a generally triangular shaped plate having an apertured tip and an opposite downwardly extending flange, a transversely extending clamping strap positioned along one side of said flange, opposite ends of said clamping strap embracing the upper end of said struts, and a pair of vertically extending spaced clamping straps positioned along the other side of said flange, a handlebar, said pair of clamping straps embracing the central portion of said handlebar, pairs of aligned apertures formed in all three of said clamping straps and flange and a pair of clamping bolts extending through said aligned apertures for clamping said straps about said struts and handlebar and to said flange.

2. In an adjustable twin-strut handlebar construction as in claim 1, wherein said apertured tip comprises the rear end of said plate, said first mentioned clamping strap being positioned behind said flange and having its opposite ends turned over on itself, said pair of spaced clamping straps being generally U-shaped and being positioned in front of said flange, and nuts on said bolts for clamping said straps about said struts and handlebar and to said flange and for loosening said pair of clamping straps with respect to said handlebar to permit adjustment of the relative position thereof with respect to said bicycle steering wheel fork.

3. In an adjustable twin-strut handlebar construction as in claim 2, wherein the upper ends of said struts are cut off at said first mentioned clamping strap, said struts comprising a pair of hollow tubes, a pair of cap inserts for closing the upper ends of said hollow tube struts, said handlebar central portion having a reinforcing insert positioned therein, and said pairs of aligned apertures comprising two holes in said flange, four holes in said first mentioned clamping strap, and two holes in each of said pair of clamping straps, and a lock washer on each of bolts.

* * * * *